United States Patent [19]

Gruel et al.

[11] Patent Number: 5,589,902
[45] Date of Patent: Dec. 31, 1996

[54] INTEGRATED AUTOMATIC INSTALLATION FOR TAKING PHOTOGRAPHS OR SEQUENCES OF PHOTOGRAPHS

[75] Inventors: Henri Gruel, Grenoble; Michel Moraine; Serge Crasnianski, both of Meylan, all of France

[73] Assignee: KIS Photo Industrie (SARL), France

[21] Appl. No.: 417,264

[22] Filed: Apr. 4, 1995

Related U.S. Application Data

[63] Continuation of Ser. No. 38,919, Mar. 29, 1993, abandoned.

[30] Foreign Application Priority Data

Mar. 30, 1992 [FR] France .................................. 92 04041

[51] Int. Cl.⁶ ...................................................... G03B 29/00
[52] U.S. Cl. .............................. 396/3; 358/302; 358/345; 386/128; 396/1
[58] Field of Search .................................. 354/76, 77, 78, 354/290, 331; 358/443, 302, 335, 342, 345; 348/61, 578, 14, 20, 343; 359/630; 364/226.1

[56] References Cited

U.S. PATENT DOCUMENTS

| | | | |
|---|---|---|---|
| 3,683,781 | 8/1972 | Allen | 354/331 |
| 4,821,307 | 9/1989 | Flint, III | 348/14 |
| 4,864,410 | 9/1989 | Andrews et al. | 358/443 |
| 5,196,876 | 3/1993 | Thayer | 354/78 |

FOREIGN PATENT DOCUMENTS

| | | |
|---|---|---|
| 0269022 | 6/1988 | European Pat. Off. . |
| 2665315 | 5/1992 | France . |
| 3431902 | 3/1986 | Germany . |
| 9010251 | 9/1990 | WIPO . |

OTHER PUBLICATIONS

Japanese Patent Abstract, Publ. No. 61144994, Inventor: Kobayashi Makoto, Nov. 1986.

*Primary Examiner*—Howard B. Blankenship
*Attorney, Agent, or Firm*—Harris Beach & Wilcox, LLP

[57] ABSTRACT

A photo installation having an acquisition element intended to receive the optical image of a subject desired to be photographed. The acquisition element is connected to a central processing unit for storing the optical information thus received. The installation is provided with a screen connected to the acquisition element that allows simultaneous viewing by the subject of the image received by the acquisition element. A printing device is provided to take a photograph or a sequence of photographs upon command of the subject. A half-silvered mirror is mounted on the optical axis of the acquisition element and directed along the bisector of the angle defined by the respective optical axes of the acquisition element and the screen so as to generate a virtual image of the screen on the optical path of the acquisition element. The installation is also provided with an interaction element intended to be actuated by the subject to freeze the image viewed on the screen at the instant of its actuation and to cause the photograph to be taken.

22 Claims, 7 Drawing Sheets

INTEGRATED AUTOMATIC INSTALLATION FOR TAKING PHOTOGRAPHS OR SEQUENCES OF PHOTOGRAPHS

This is a continuation of application Ser. No. 08/038,919 filed on Mar. 29, 1993, and now abandoned.

BACKGROUND OF THE INVENTION

1. Field of the Invention

The invention relates to an improved installation for automatically taking photographs or sequences of photographs, and in particular identity photographs, portraits or short films recorded on video cassettes.

2. Discussion of the Prior Art

The need for identity photos, both for official documents and for tickets, etc. has already existed for a long time, and is increasing. In fact, in face of the magnitude of demand, automatic installations capable of allowing such identity photos to be taken were quick to emerge. Such installations generally comprise a booth which can be closed at least partially, provided with a seat on which the subject to be photographed sits. Facing the seat there is a transparent window behind which a photographic camera is mounted which is capable of taking photographs in association with a flash or a lighting bank. After approximate adjustment of the height of the seat, the user inserts the sum required into a coin slot mechanism in order to cause activation of the photographic camera and the taking of one or more photographs in a given format.

The drawback of such installations resides in the fact that the adjustment of the positioning of the subject is never more than approximate and is rarely satisfactory inasmuch as it is not possible for the subject himself to check the framing and general appearance of the photograph.

Installations of the type in question, provided in addition with a video camera connected to a viewing screen which is intended to allow the subject to view the photograph to be taken, have therefore been proposed. This screen is in general positioned at the level of the partition of the booth comprising the image acquisition system, but off-axis with respect to the optical axis of said system. After said subject is satisfied with the photo to be taken by viewing said screen, he actuates via an element a photographic camera of the type previously described, the shooting in itself remaining conventional. It is obvious that by doing so the frame obtained is not satisfactory, since when the subject checks the photo to be taken on the screen, he does not look in the optical axis of the acquisition system, given that the screen is not aligned on this optical path, and therefore the photo obtained contains the off-axis profile of the subject (see for example document EP-A-0,269,022).

It has therefore been proposed, in order to overcome this drawback, in particular in document U.S. Pat. No. 4,864,410, to acquire the photograph by a digital means, via a video camera, and to reconstruct the image thus acquired on a video screen situated on the optical axis of the camera. In order not to interfere with the acquisition of the image, the video screen is actually positioned at 90° with respect to the optical axis of the camera, and its image is virtually placed on said optical axis by means of a half-silvered mirror oriented at 45° to this axis. In this way, the user is able to view his image, while remaining strictly aligned with the camera which is capable after subsequent processing to deliver a photograph. Although this device indeed makes it possible significantly to improve the quality, in terms of framing and checking of the frames taken by the subject, the user is not, on the other hand, given the possibility of choosing the exact moment of the shot, given that the initiative for taking the photograph still lies with the device.

In order to give a further degree of initiative to the user, an automatic device has therefore been proposed (see for example FR-A-2,665,315) in which a certain number of shots are made, then presented to the user on a video screen. The user makes a selection using a selector, in order to obtain the printing of the shot which he finds suitable. Although constituting an improvement in terms of checking by the user himself, this device still does not make it possible to take the photograph at the instant desired by the latter, that is to say when he is viewing on the video screen the image which he finds suitable.

SUMMARY OF THE INVENTION

The subject of the invention aims to overcome these various drawbacks. It relates to an integrated automatic installation in which the subject may continuously view the image picked up by the device for acquiring the image, while always looking along the optical axis of the latter.

This installation for taking photographs or sequences of photographs, includes an acquisition element intended to pick up the optical image of the subject of whom it is desired to take a photograph or a sequence of photographs that is associated with an element for storing the information thus picked up, a screen connected to the acquisition element intended to allow simultaneous viewing by the subject of the image or of the images seen by the acquisition element, and a photographing device for actually taking the photograph or the sequence of photographs.

The installation of the invention further includes a half-silvered mirror, mounted on the optical axis of the acquisition element and directed along the bisector of the optical axes of the acquisition element and of the screen respectively, so as to generate a virtual image of the screen on the optical axis of the acquisition element, a central processing unit connected to the acquisition element and fitted with a digitization card, intended to digitize the analog signals picked up by the acquisition element, the digital signals thus obtained being capable of undergoing processing at the central unit, then being conveyed to the screen so as to allow simultaneous viewing by the subject of the image or of the images seen by the acquisition element and possibly processed by the central processing unit, and an element for interaction between the central processing unit and the subject, capable of being actuated by the latter, and intended to freeze the image reproduced on the screen at the instant of its actuation in a memory associated with the central processing unit and to induce its production by the photographing device.

In other words, the invention consists in arranging the installation so as to direct the optical axis of the screen and that of the acquisition element so that they coincide at a half-silvered mirror directed along the bisector of the angle formed by the two optical axes, in order to obtain a virtual image of the screen at the acquisition element, that is to say facing the subject, and to allow a print to be made on explicit action by the subject. In other words, while looking at himself in the virtual image of the screen, the subject, unknowingly, fixes the acquisition element, and may thus decide at a given instant t, actually to produce the image which he sees. By virtue of the actual principle of the acquisition process, and taking into account the memory storage of the shot which meets with the subject's approval, it is therefore possible to print the frame in question as many times as desired.

The acquisition element is advantageously, and in a known manner, hidden behind a window, so that the subject is capable of directly viewing the image seen by the element at this level.

According to one embodiment of the invention, the half-silvered mirror is directed at 45° on the one hand with respect to the acquisition element, and on the other hand with respect to the screen. In this way, the angle defined by the two optical axes of the acquisition element and of the screen, respectively, is a right angle.

In order for this element not to be visible by the subject, the space situated behind the half-silvered mirror is in shadow or darkness.

According to the invention, the acquisition element may include either a video camera;

a photographic camera provided with a pick-up with a charge transfer device;

a color scanner capable, starting from a given image, text or photograph, of analyzing the image by scanning, and of converting the analog signals collected into digital signals, this latter step also being capable of being performed by means of a digitization card fitted into said processing unit;

a video tape recorder associated with a video screen, into which video tape recorder is inserted a video cassette which is played on the screen, allowing freeze-frame selection of the view or views which it is desired to obtain or;

an electronic apparatus making it possible to read an image previously recorded in digital form on a removable medium, such as a photographic CD or a floppy disk drive.

According to another embodiment of the invention, the acquisition element comprises two cameras, whose field of acquisition is respectively vertical and horizontal; the optical axis of one of the two cameras is coincident with the acquisition axis of the installation; the optical axis of the other camera is virtually coincident with the acquisition axis of the installation by means of a half-silvered mirror positioned along the bisector of the real optical axes of the two cameras. In this way, shots may be acquired equally by one or the other or by both of the cameras as a function of the desired type of photographs. It is then possible with such an installation to print photographs both of the portrait type, that is to say directed vertically, and the landscape type, that is to say directed horizontally, and to do this without requiring any mechanical rotation of the camera, and while preserving the quality of resolution of the photographs of a given type obtained by means of an installation adapted to this type alone.

According to an advantageous characteristic of the invention, the central processing unit is furthermore capable of fitting the subject acquired in the form of digital signals by the acquisition element into a backdrop, this backdrop consisting of digital signals stored in a memory associated with the processing unit, and capable of forming another image intended to form a foreground, background or as a back projection onto said subject, or alternatively in the form of a text, this being either stored in the associated memory, and being in this case predefined, or introduced into the central processing unit by the user of the installation, this being by means of a keyboard.

In the same spirit, it is possible to alter the final format of the shot, either by providing the acquisition element with a zoom, if the element consists of a video camera or of a photographic camera, or by subjecting the digitized image, after acquisition, to a variation of format. The choice of the format may be left to the discretion of the user, or may be preset by the operators of the installation, who then propose a plurality of sizes, such as for example the sizes required by national standards.

In a developed version of the invention, the central processing unit comprises external data-acquisition means, in particular in radio form, in the form of the telephone network which is switched using a modulator and demodulator or with the integrated service digital network (ISDN), or alternatively by direction introduction using a reader for magnetic or optical media, such as in particular floppy disks or disks, data being capable of being introduced to the image to be produced as a foreground, background or back projection.

In a first embodiment of the installation, the device for taking the photographs consists of a color printer using thermal sublimation connected to the central processing unit in order to receive from the latter the digital signals corresponding to the image selected by the subject.

In another embodiment of the invention, a photograph is not made, but rather a film recorded on a video cassette directly from images seen by the camera and processed by the central unit, and from audio signals picked up by a microphone fitted to the booth, the film thus produced then being recorded by means of a video tape recorder.

In a further developed version of the preceding embodiment, it is possible to mix at the central unit the film picked up by the video camera with either a film recorded on a video cassette and readable by means of a video tape recorder incorporated into the installation, or with signals coming from a video disk, and readable by an adapted reader also incorporated with the installation.

In yet another embodiment of the invention, the device for taking the photographs consists of a unit for printing photographs that includes an element for storing, unwinding and exposing a reversible photosensitive paper intended to be exposed to light signals;

a chemical processing unit, consisting of a plurality of juxtaposed baths and fitted with an automatic element for transferring the exposed paper into the various baths;

and an element intended to dry the frame thus obtained after printing;

a digital processing unit, fitted to or connected with the central processing unit, and capable of subjecting the signals coming from the central unit to a video reversal processing;

a screen connected to the central processing unit and intended to form the image to be taken in negative and at least one lens placed on the optical axis of the screen and intended to project the image of the screen formed, and to adapt its format to the zone of exposure of the photosensitive paper.

The term "video reversal" processing means processing capable of converting a color or black and white positive image into a color or black and white negative image, in the meaning of the term understood in the field of photography, with adequate color adjustments. These color adjustments make it possible to obtain photographs of optimum quality by compensating for the various drifts of the system, which cannot be done with conventional devices.

In the same way, a "non-reversible" photosensitive paper is, in a known manner, capable of reconstructing a positive image from an exposure by light signals of a negative image. Similarly, a "reversible" photosensitive paper is capable of reconstructing a positive image from an exposure by light signals of a positive image.

In other words, the object of this embodiment is to make it possible, starting with digital signals representing an image, and for example a subject, to obtain a conventional photograph by chemical means.

The screen acting as a light source is a color screen or a black and white screen associated with color filters interposed on its optical axis in the vicinity of the lens, in order to reconstruct the image in color at the photosensitive paper to be exposed.

According to an advantageous version of the latter type of installation, the element for storing the photosensitive paper consists of two cassettes, the end of each of the rolls of paper which they contain being prewound onto a respective set of drive/press rolls, and one of the cassettes comprising in the vicinity of its exit slot an element for detecting the presence of the end of the paper, causing the rewinding of the paper inside the cassette in question, and correlatively the prewinding of the set of drive/press rolls of the second cassette, in order to cause it to unwind through the exposure zone.

BRIEF DESCRIPTION OF THE DRAWINGS

The manner in which the invention may be produced and the advantages which stem therefrom will emerge more clearly from the embodiment examples which follow and are given by way of non-limiting indication with the aid of the attached figures.

DETAILED DESCRIPTION OF THE PREFERRED EMBODIMENTS

Figure 1:
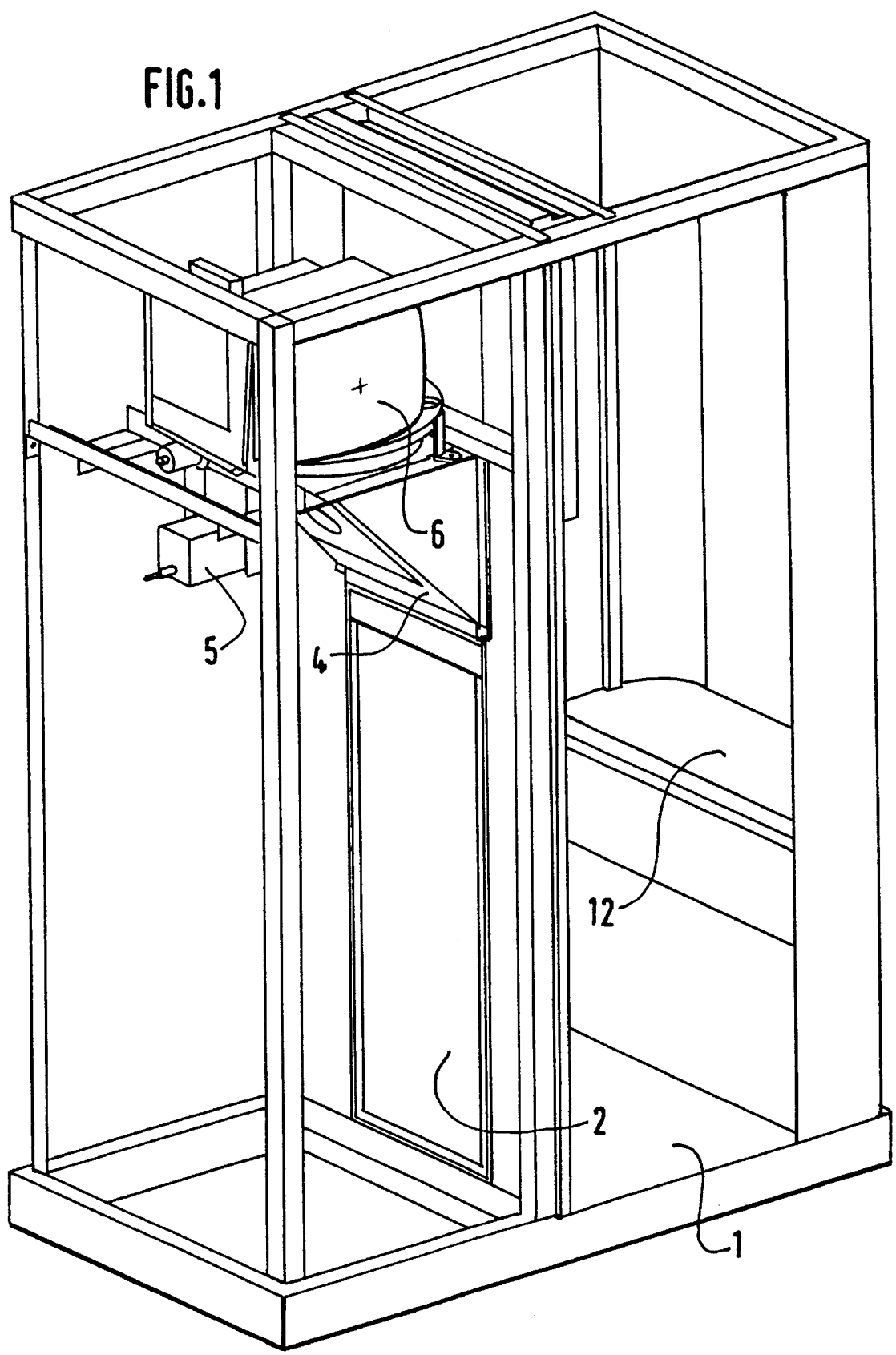
FIG. 1 is a diagrammatic perspective representation of an installation according to the present invention.
Figure 2:
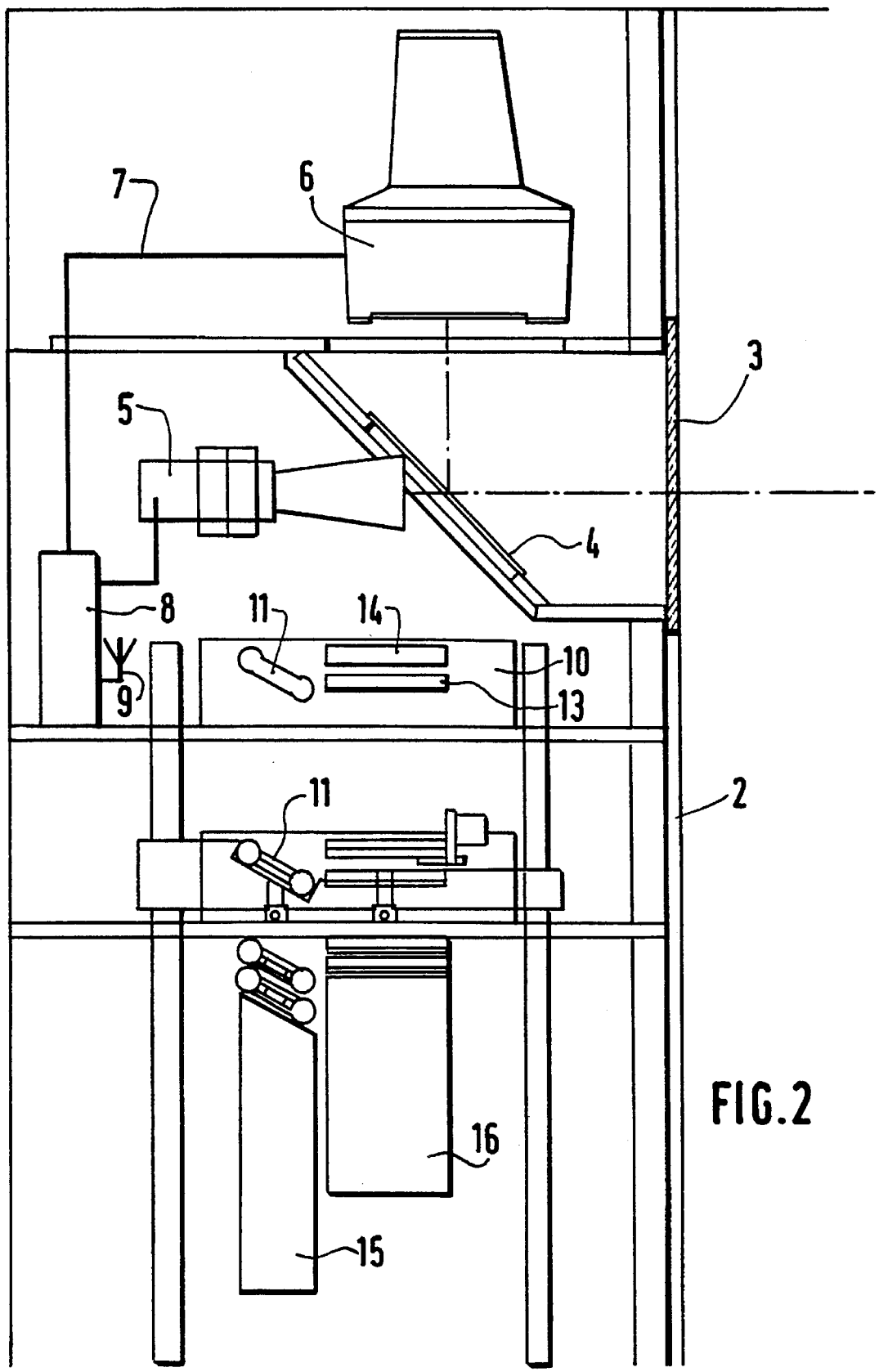
FIG. 2 is a diagrammatic representation of the installation of FIG. 1 according to a first embodiment of the invention.

As can be seen in FIGS. 1 and 2, the installation according to the invention comprises a booth (1), comprising a seat (12) whose height can be adjusted, onto which the subject or subjects of a photograph or of a sequence of photographs, can sit. Conventionally, this booth comprises on one of its faces a partition (2), at least part of which has a window (3), in order to allow light signals to propagate towards the zone of acquisition of the image.

This zone includes an acquisition element, here consisting of a video camera (5), whose lens is directed towards the window (3), its optical axis being thus horizontal overall. The camera (5) is directly connected to a central processing unit (8) intended to allow acquisition and processing of the final image to be produced. This processing unit (8) is connected by a line (7) to a visual reconstruction screen (6), oriented at 90° with respect to the camera, and positioned so that its optical axis coincides with that of the camera (5) at the window (3). The optical axes of the camera (5) and of the screen (6) thus form between them an angle of 90°. The screen (6) is intended immediately to reproduce the images seen by the camera and processed by the central unit (8). A half-silvered mirror (4) is positioned at the point of coincidence of the two optical axes, along the bisector of said angle. It is thus oriented at 45° with respect to the optical axis of the camera (5).

According to the invention, the central unit (8) comprises a digitization card intended to convert the analog signals generated by the camera into digital signals. The digital signals thus obtained are stored in a memory associated with the central unit, which typically consists of a microcomputer.

According to an advantageous characteristic of the invention, the memory also stores backdrops or foregrounds, of the landscapes, famous people, particular events, etc. type, which can be selected by the subject and are intended to appear at the choice of the latter in a foreground, background or back projection on the subject. In the particular case of making a short film, these stored images are capable of being animated and therefore of being thus reconstructed in the film.

According to another particularly advantageous characteristic of the invention, the central unit (8) comprises external data-acquisition means, in particular of the type of those described in the previous paragraph. These external means are of any kind, and may for example consist of an antenna (9) capable of picking up radio signals, thus allowing remote loading, but also a modem (modulator-demodulator) connected to the switched telephone network, or to the integrated service digital network. Such information can also be introduced into the central unit by a simple reader for magnetic media, and in particular floppy disks or optical disks.

It is thus seen that many possible choices are offered to the subject, who may desire to be photographed in connection with the news or with major events.

Figure 4:
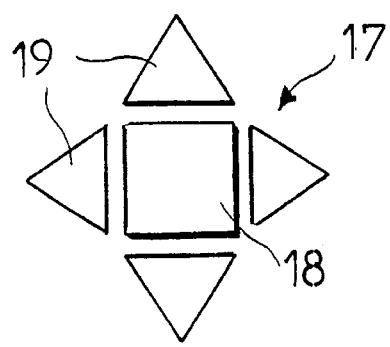
FIG. 4 is a diagrammatic representation of the interaction element of the invention.

In order to do this, once the subject is in place facing the window (3), he is immediately filmed by the camera (5), and his image, as well as the foreground, the background and/or the back-projected image selected also appear in background with respect to the window (3), taking into account the production of the virtual image of the screen by the half-silvered mirror (4). He may thus at his leisure change his position, his smile etc., until he achieves an image which he finds suitable. He then causes the corresponding photograph to be taken by actuating a control (or interaction) element (17), as shown in FIG. 4, which first causes instantaneous immobilization of the corresponding image in the central unit (8), and next causes activation of a device for producing the image thus interactively selected by the subject.

This interaction element (17) comprises in particular a central validation pushbutton (18) via which the immobilisation of the image is achieved, and four arrow-shaped buttons (19) capable of causing a cursor to be moved through instruction screens (not shown) made inside the partition (2) and connected to the central processing unit (8). In fact, each instruction screen is constructed on the same principle, so that the user may learn the operation of this principle on the first screen, and may deduce therefrom the operation of the rest of the program in terms of operation of the installation and its varied possibilities.

Advantageously, this interaction element (17) is positioned on an inclined console, so that the user can actuate it without moving his shoulders.

In a first embodiment of the invention, the element for producing the image consists of a printer (10), FIG. 2, for example using thermal sublimation, of the HITACHI VY 150 A or 200 A type, which is capable, from digital signals sent by the central unit (8) of reconstructing a color print of quality substantially comparable to that of a photograph. Although not constituting the subject of the invention, the principle of operation of such a printer will be described in brief.

The latter is based on the principle of color subtraction, starting from three primary colors yellow, magenta and cyan. These pigments are previously coated onto a thermal film (11) capable of being locally heated by the pins on the printing head of the printer, as a function of digital signals received from the central unit (8). This thermal film is divided into zones of surface area corresponding to the surface area of the photograph to be produced, and successively coated with yellow, magenta and cyan pigment, which pigments are in solid form. The medium on which the photos are to be produced is in the form of sheets typically made of polyethylene or polyester, which comprise on their surface a layer of material capable of allowing diffusion of the pigments when the latter, under the action of the heated pins of the printing head, are sublimed and diffused at its surface. The degree of this diffusion is a function, on the one hand, of the intensity and, on the other hand, of the duration of the heating. The sheets of the medium are advantageously stored in a paper magazine (13), of the type of those known for photocopiers, and other laser printers.

The photo to be printed is "printed" line by line, or frame by frame by the printing head for each of the pigments, in accordance with the two following possibilities:

the thermal film and the medium remain stationary, and the printing head moves over the whole length of the photo;

the printing head is stationary, and the thermal film and the paper move over a length corresponding to that of the photo to be produced.

The photo then obtained leaves the printer through the paper exit orifice (14), before being conveyed by any appropriate means to a receptacle for the subject to take hold of the photo.

According to an advantageous characteristic of the invention, and in order to increase the operational autonomy of such a printer, the installation is provided with an automatic loader (15) of thermal film, intended to replace the used thermal film cassette with a new one, and with an automatic loader (16) of cassettes (13) of the photography medium.

Such automatic loaders are in themselves known for equivalent applications. They typically have an enclosure in which the medium or thermal film cassettes are stacked, and comprise a pushfinger or equivalent system intended to allow the finished cassette to be removed and a gripping member, for example provided with suckers, in order to allow a new cassette to be placed in its operating position.

As already stated, the subject may desire a background or a foreground on the photograph. In order to do this, he selects from the backdrops in memory in the central unit (8) the one corresponding to his choice, which is then fitted into the photograph by the central unit and is reproduced on the screen (6).

Furthermore, it is possible in this context to overlay a photo in portrait format, and therefore with vertical orientation, in an image with a horizontal favored orientation, for example of size twice the portrait format of the photo, said photo being capable of being overlaid at any point of the horizontal image, the whole thus viewed at the screen is processed in the central unit, prior to its actual production on the medium.

Figure 7:
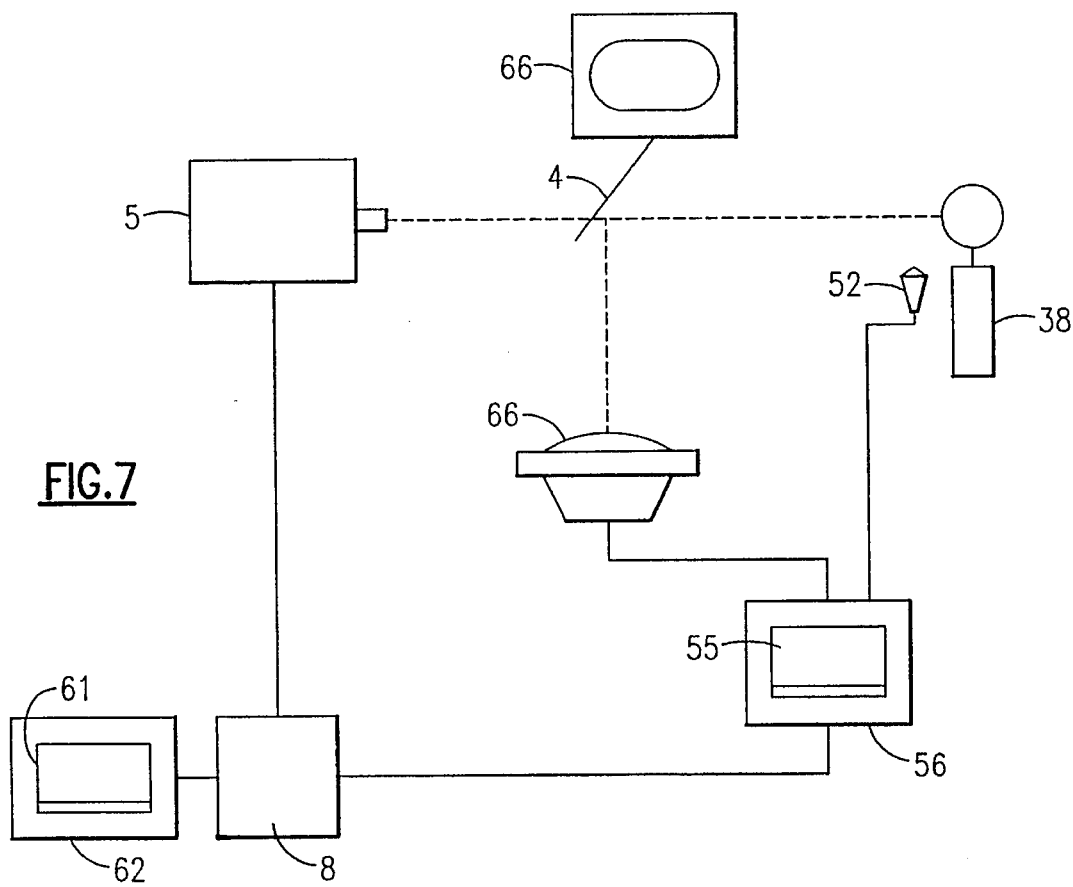
FIG. 7 is a diagrammatic representation of still another embodiment of the present invention.
Figure 9:
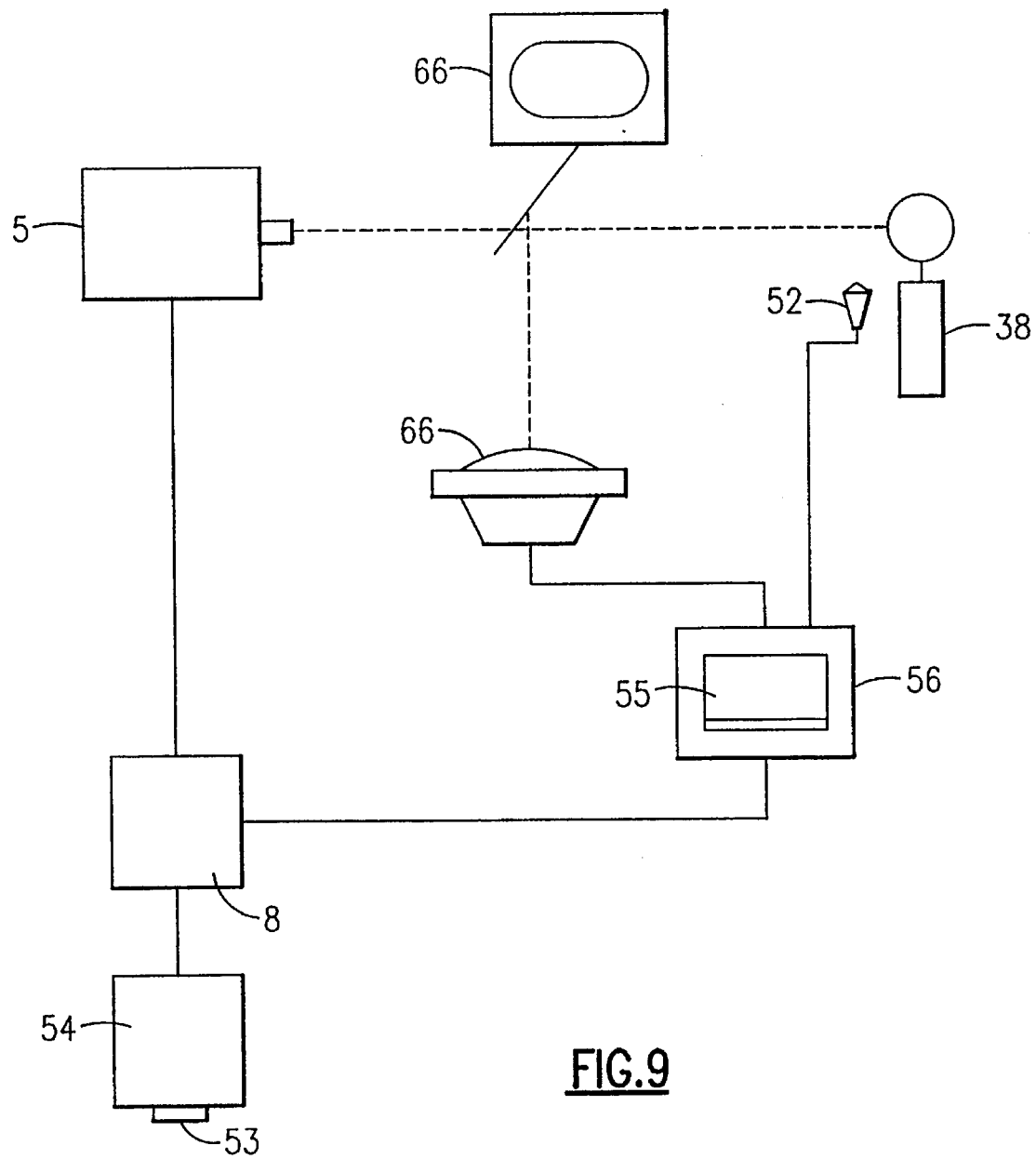
FIG. 9 is a diagrammatic representation of still another embodiment of the present invention.

The procedure is the same when short films are involved. In this case, as seen in FIG. 7 and 9 the installation also comprises a microphone 52 capable of recording the commentary of the subject with the images of the latter. As in the case of photographs, it is possible to fit into the film an animated backdrop selected by the subject, or introduced in the form of floppy disks, 53 as shown in FIG. 9 video disks or any equivalent means into the central unit by reading using an appropriate reader, 54 which central unit then executes the integration of the images picked up by the camera with the backdrop. This integration may also be performed from an actual film recorded on a video cassette, 61 and read into the processing unit by a video tape recorder 62, and shown on video screen 66. In this case, the film obtained is itself recorded in particular onto a video cassette 55 by means of another video tape recorder 56. The user then obtains this video cassette ejected from the video tape recorder after recording said film.

In a developed version of the invention, the central unit (8) may also fit into the photo or into the film text overlays, of the type comprising a predefined message selectable by the subject, or alternatively, text introduced by the subject himself by means of a keyboard (not shown) arranged in the booth. A self-service photographic composition installation is thus obtained making it possible for example to obtain visiting cards or business cards with a color photo, or equivalent products.

In another embodiment of the invention, the element for producing the image consists of a unit for printing and developing a photosensitive paper by chemical means.

Figure 3:
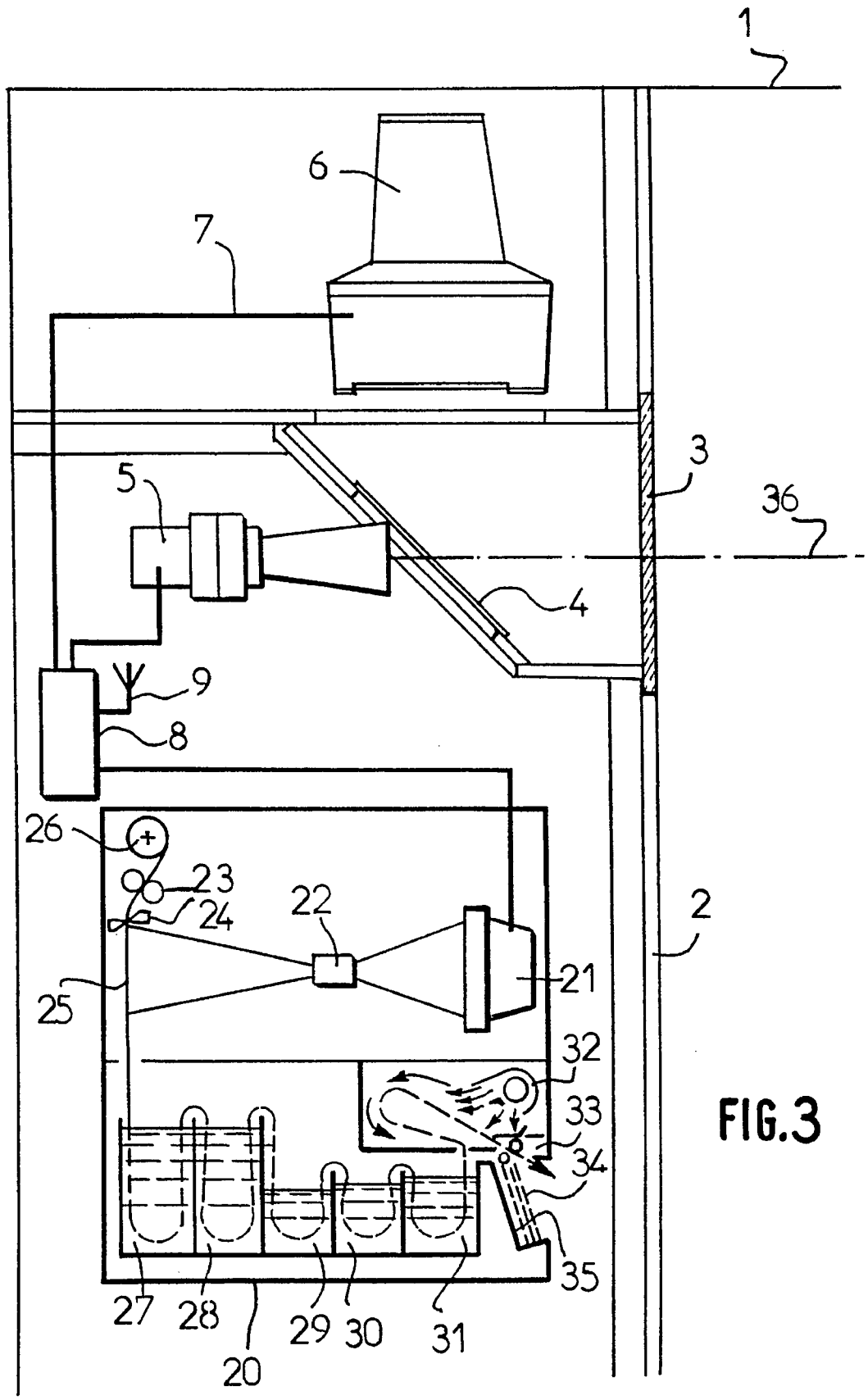
FIG. 3 is a diagrammatic representation of another embodiment of the invention.

According to this version represented in FIG. 3, the installation fundamentally comprises an enclosure (20), one part of which is sealed against light in order to form a dark room. This part constituting a dark room is intended to allow exposure of a photosensitive paper (25), as will subsequently be described. Fundamentally, it comprises a screen (21) capable of reconstructing a processed image, an lens (22) located on the optical axis of the screen (21) and the reversible or non-reversible photosensitive paper (25) stored in the form of a spool and enclosed in the conventional manner in a removable and interchangeable cassette (26) which is also sealed against light. The lens (22) is, in a known manner, intended to project the image reproduced on the screen (21) onto the photosensitive paper (25). The screen may be a color screen or a black and white screen 21, on the optical axis of which color filters 51 are interposed in the vicinity of the lens 22 so that a color image may be reconstructed on the photosensitive paper 25. In a developed version of the invention, this lens may be replaced by an lens with different optical characteristics, in order in particular to change the format of the final photo. In a version intended for automatic photographing booths, for identity photos, the lens may consist of four lenses in order directly to obtain a frame comprising four identity photos.

Thus, the paper leaving the cassette is conveyed by means of an element (23), typically drive and press rolls, to the exposing and exposure zone, then is cut to the desired format by shears (24) or any appropriate device, when the exposure time has reached the set value.

In fact, and after exposure for a sufficient time, the paper (25) is taken by an automatic system which conveys the exposed paper to chemical processing baths, by automatic passage first through a developer (27), a bleach fixer (28), and various successive wash baths, for example three (29, 30, 31) before being dried, in particular using a fan (32) in a drying enclosure (33). Finally, it is conveyed into a receptacle (35) in which prints (34) are then available.

The operation of such an actual printing installation is described in more detail in document EP-A-0,296,080.

According to the invention, the signals conveyed to the screen (21) are analog or digital signals, coming from processing in the central processing unit (8), after acquisition by an acquisition element, and typically by the video camera (5).

Whatever the element for acquisition of the signals, subsequent to their digitization, they undergo in the central unit (8), in this embodiment, video reversal processing, that is to say conversion of the image thus acquired into a negative image, at least in the accepted sense in the field of photography.

Typically, this video reversal processing is performed using appropriate software. The latter, from the digitized image, whose signals for each pixel correspond to the intensity in each of the base colors, namely, red, green and blue, the intensity I ranging from 0 to 255, consists in reversing these values, by replacing the value I of the intensity for each of the colors by the value 255−I. This processing is also accompanied by color adjustments, in order to take into account on the one hand the interdependencies of the colors, and on the other hand, the perception of these colors by the human eye, and also the varying selectiveness of the sensitivity of the photosensitive paper with respect to the colors.

The image acquired by the camera (5) then processed by the central unit (8) is, as already stated, viewed in real time by the subject on the screen (6). Thus, when he finds the image he sees suitable, he freezes it using the interactive element (17), both on the screen and in the memory of the central unit (8). This frozen image, stored in the central unit in the form of digital signals, undergoes therein the video reversal processing before being transmitted to the screen (21) of the printing unit (20), at which they are visually reconstructed in the form of a negative image. Nevertheless, in another embodiment, the video reversal processing may be performed in analog at the screen (21). These optical light signals then pass through the lens (22), in order to adapt the format of the image thus reconstructed to the desired format, then expose the non-reversible photosensitive paper (25), which in a known manner, on the basis of a negative image, reconstructs a positive image after printing in the chemical processing baths already described.

In another version of this embodiment, the digital signals obtained after acquisition and approval by the subject do not undergo a video reversal, and are conveyed directly to the screen (21) of the printing unit (20) in the form of a positive image, which passes via the lens (22) to a reversible photosensitive paper (25), in order to reconstruct a positive image.

The chemical products of the processing baths oxidize slowly, in order, on the one hand, to improve the autonomy of operation of the printing unit and, on the other hand, to alleviate general maintenance of the installation. Typically, with appropriate baths, it is possible to obtain high-quality photos for several months with the same baths.

In order to obtain photos of good artistic quality, it is important to use a flat screen (21) which is capable of correcting the chromatic and geometric aberrations, and in which the vignetting defect, that is to say the overexposure of the center with respect to the corners, does not exceed a third of the f-number.

Figure 6:
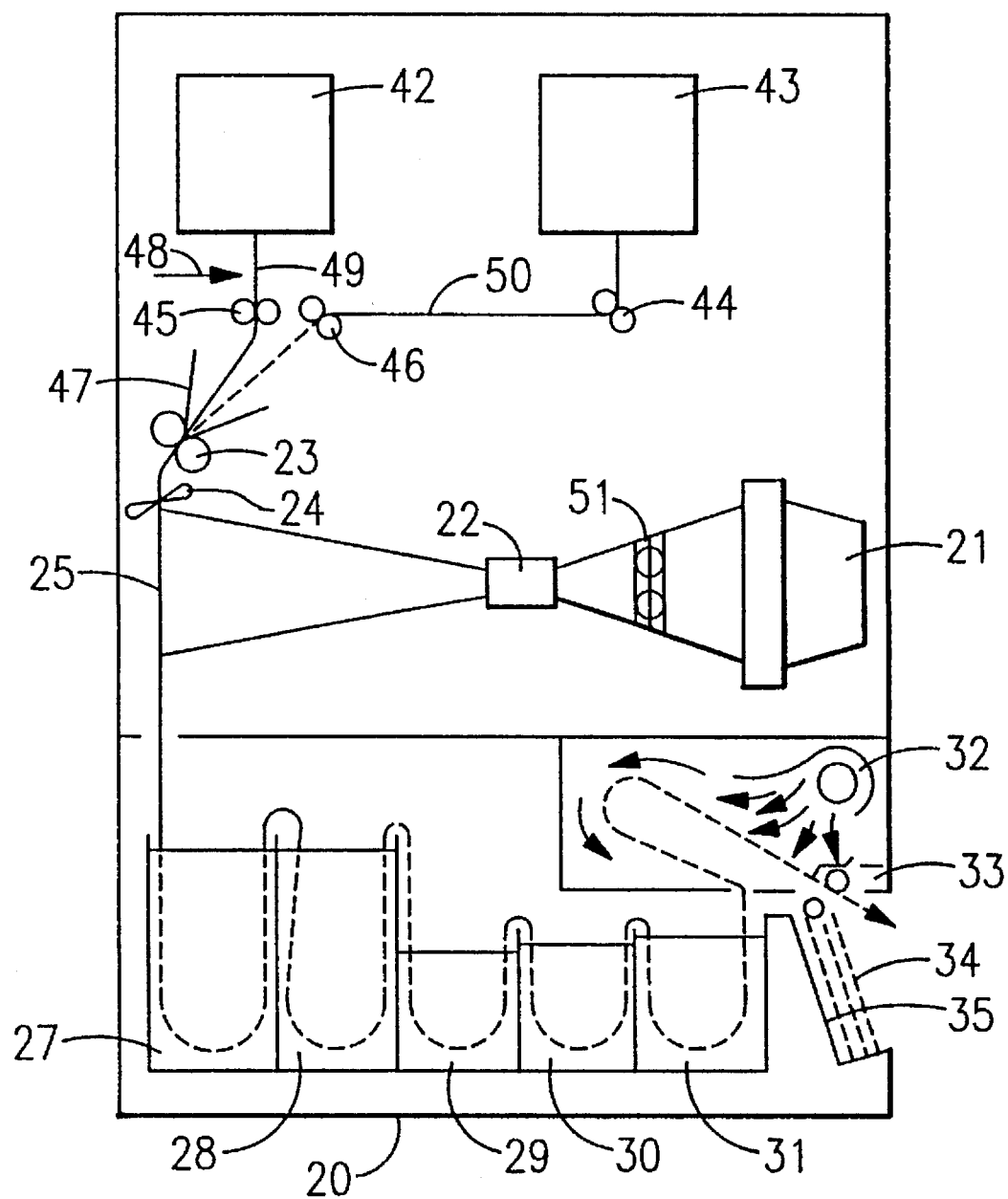
FIG. 6 is a diagrammatic representation of another embodiment of the installation of FIG. 3.

In an advantageous version of this embodiment, the printing unit (20) is provided not with one but with at least two photosensitive paper cassettes. Referring to FIG. 6, the two cassettes, respectively (42) and (43), may be observed, of which the end of the spool of photosensitive paper is previously prewound onto drive elements, typically consisting of a set of two drive/press rolls (45, 46). Furthermore, the paper leaving the cassette (43), which is off-axis with respect to an introduction element (47) and the unwinding element (23), is returned by means of return rolls (44). The cassette (42) also comprises at the slot for exit of the paper, an end-of-paper detector (48), for example consisting of a photoelectric cell, which causes, when it actually detects the end of paper zone on the paper strip (49), the operation of the rolls (45) so as to retract the paper strip from the introduction element (47), and its retraction into the cassette (42), and correlatively the introduction of a paper strip (50) coming from the cassette (43) into the introduction element (47), which itself guides the strip (50) into the unwinding element (23), so as to involve this strip in the printing process.

Thus, maintenance of the installation is correspondingly alleviated, since the quantity of consumable material may be doubled. Furthermore, this variant also makes it possible to make a real saving, since when there is only one cassette, taking into account the frequency of visits of the maintenance service, it is important to change the cassette whatever the quantity of photosensitive paper remaining therein, which paper is irredeemably lost.

Figure 8:
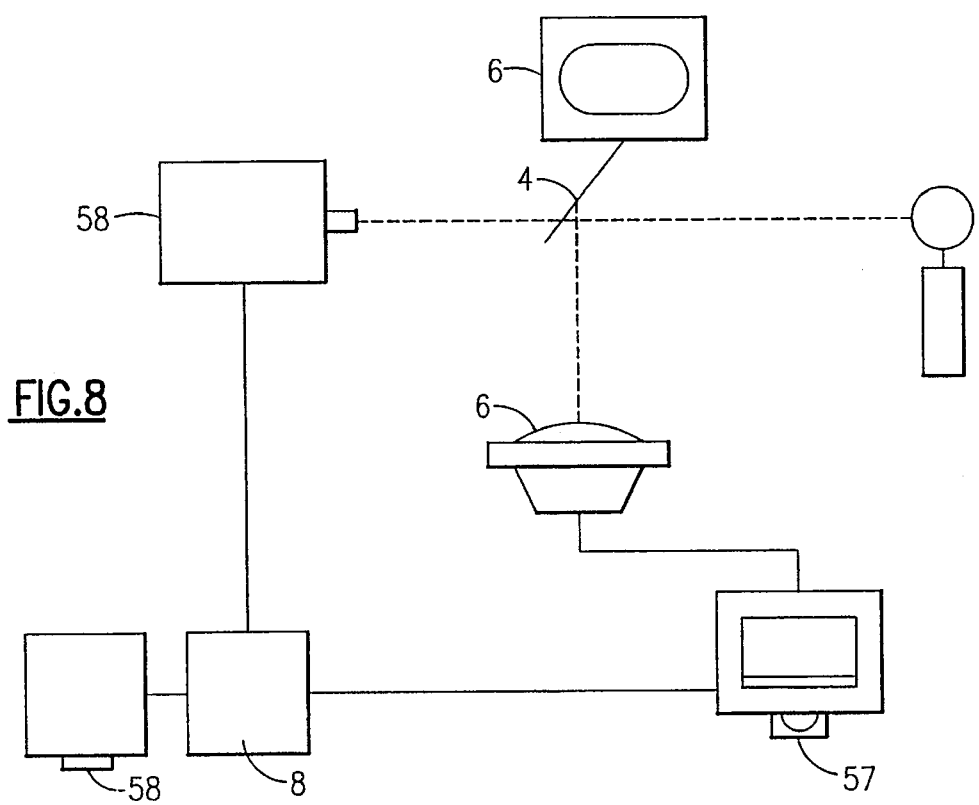
FIG. 8 is a diagrammatic representation of yet another embodiment of the present invention.

The various examples previously described employ a camera as the element for acquiring signals. Now, this element may consist of other devices, and for example of a scanner which, in a known manner, converts an image, a photograph, or a text in accordance with a graphics card, which is capable subsequently of being digitized in the central processing unit (8). This scanner may be a color scanner 58 as shown in FIG. 8. It advantageously constitutes a peripheral of the central unit (8). This scanner makes it possible, for example, to produce new frames from a pleasing photo, and furthermore makes it possible to add a caption text for such a photo. In the same manner, it makes it possible to fit the logo of a company, or any recognition sign, onto commercial or identification papers.

In another embodiment, this acquisition element consists of a traditional photo camera, which is, however, provided with a pick-up with a charge-transfer device of the video type. This pick-up is connected directly by a physical connection, and in particular by a cable to the central unit (8), in which the signals thus picked up are digitized. In another embodiment, shown in FIG. 7 in which the acquisition system also consists of a photo camera, the latter further comprises a pick-up with a charge-transfer device, a device for storing said signals on a floppy disk and in particular a video disk, 57 for example in a two-inch format, which, after acquisition, can be read using an appropriate reader connected to the central unit (8). In fact, there is then a transfer of the signals recorded on the floppy disk into the central unit in which they first undergo digitization before the subsequent processing.

It is also possible to provide as the acquisition element or system a reader for floppy disks 58, as shown in FIG. 7 or photographic CDs, on which digital signals are stored representing a given image, a text, or any data representing a visual reproduction.

In certain particularly advantageous versions, it is also possible to provide the installation with a video tape recorder intended to allow the reading of a video cassette on which analog signals representing any sequence are stored. In fact, by using the "freeze-frame" button, which all video tape recorders have, and by running said cassette on a video screen associated with the video tape recorder, it is possible to select the particular view, and to switch it into the central unit (8) in which it undergoes the digitization, then video reversal processing.

Figure 5:
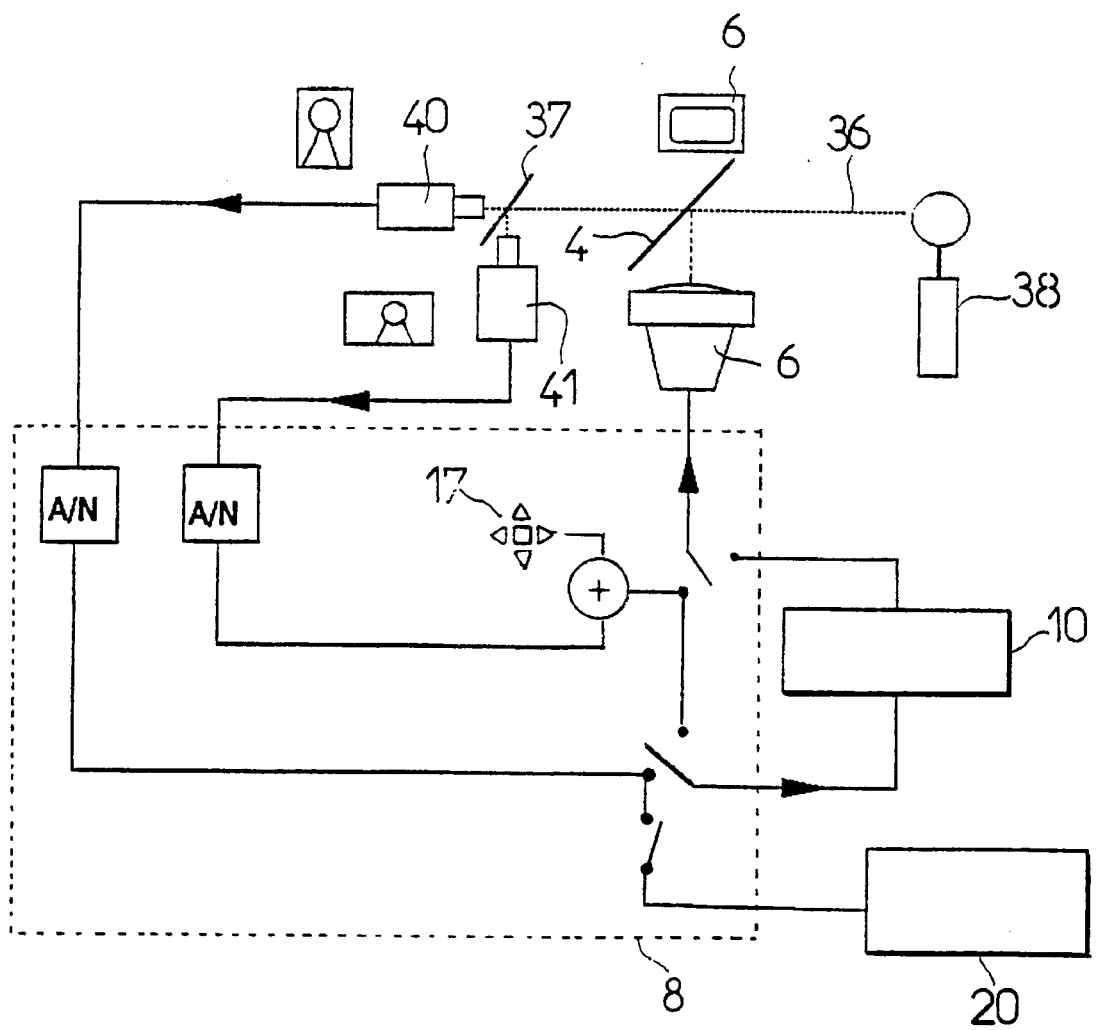
FIG. 5 is a simplified block diagram of the double-camera installation.

In a developed version of the invention (see FIG. 5), the acquisition element comprises two cameras (40, 41), whose acquisition field is respectively vertical and horizontal. Furthermore, the optical axis of one (40) of the two cameras is actually coincident with the acquisition axis (36) of the installation. In contrast, the optical axis of the other camera (41) is virtually coincident with the acquisition axis (36) of the installation, by means of a half-silvered mirror (37) positioned along the bisector of the real optical axes of the two cameras (40, 41).

Thus, and taking into account this spatial arrangement, the signals picked up by the camera (40) pass through two half-silvered mirrors (4, 37) so that whichever of the cameras picks up the signals, the latter are immediately visible on a viewing screen (6), as has already been described, after passage and processing in digital form in the central processing unit (8). It is obvious that by virtue of the use of half-silvered mirrors, the subject permanently fixes, still unknowingly, the two cameras by viewing the screen (6).

The term "field of acquisition" of the cameras means the surface area actually acquired by the camera, for which the resolution remains such that high-quality reproduction in image terms is obtained. Typically, CCD cameras available today have a resolution of 768×576 pixels, so that the field of acquisition is an overall rectangle. In fact, there is a favored orientation of this type of camera. Thus, when it is desired to take photos of the "landscape" type, that is to say with a horizontal favored orientation, it is suitable to use a camera oriented correspondingly in order to obtain the desired resolution in the photo produced. The same is true if it is desired to produce photos of the "portrait" type or identity photos, in which the favored orientation is then vertical.

With the double-camera acquisition system of the invention, the acquisition of shots may be performed equally by one or other or by both of the cameras as a function of the desired type of photographs. It is then possible with such an installation to print both photographs of the portrait type, that is to say oriented vertically, and of the landscape type, that is to say oriented horizontally, and to do this without requiring any mechanical rotation of the camera, while preserving the quality of resolution of the photographs of a given type obtained by means of an installation adapted to this type alone. The use of the viewing screen (6), the immobilization of the image on this screen by the subject (38) via the interaction element (17), and the production of the appropriate connections are managed by the central unit (8), inside which the A–D digitization cards are also to be found.

If the subject (38) means to obtain a photo in portrait mode, he previously selects this mode via the interactive element (17). The camera (40) is in this case intended to acquire signals picked up, with a view to processing them in the central unit (8), then taking an impression of the image fixed by the subject. In corollary, the camera (41) is used for viewing and checking by the subject, taking into account that in the example described, the viewing screen is itself oriented in landscape mode.

In the opposite case, that is to say if the subject means to obtain a photo in landscape mode, it is then the camera (41) which in this case ensures both viewing for checking using the screen (6) and acquisition of the signals for impression or printing of the photo.

It is thus understood that it is possible to obtain with the installation according to the invention photographs from any digital signals whose origin is a physical or synthetic image.

In certain particular applications such as in particular visiting cards, it is possible to associate a keyboard (not shown) with the central unit (8), which keyboard is intended to allow the user of the installation to insert certain text onto the medium of the photos.

In this way, after processing in the central unit, it is possible with the installation according to the invention to produce visiting cards comprising, on the one hand, a photograph of the owner of the card and, on the other hand, a text photographically printed on the card. Furthermore, and taking into account the installation, it is possible to produce frames of 9×13 cm and 10×15 cm format, both in portrait mode—identity photos, and in landscape mode. It is also possible by using this installation to produce postcards by gluing to the back of the frames obtained an adhesive medium, forming for example the address/text partition, etc.

Finally, it is possible in a very advantageous manner to use photographs thus obtained on identification systems, such as in particular polyester badges. In this case, it is sufficient to provide these badges with a peel-off sheet protecting the adhesive layer which is retractable when the frame obtained is fitted.

It is therefore made apparent that such an installation is of particular interest for producing both photographs, portraits, of the type currently obtained, but also short films, capable of being used both for curricula vitae and for statements of any kind. This installation combines both the quality of the reproductions obtained and the wide variety of the latter.

Furthermore, in the versions equipped with a remote-loading system, their maintenance may be performed automatically.

Finally, by virtue of the actual principle of acquisition of the image, the latter can be modified as long as it does not conflict with the approval of the subject, since it is stored in memory. In corollary, and for the same reason, as many prints as desired may be made therefrom. Furthermore, mounting with a backdrop is viewable in real time on the screen.

While this invention has been described in detail with reference to certain preferred embodiments, it should be appreciated that the present invention is not limited to those precise embodiments. Rather, in view of the present disclosure, many modifications and variations would present themselves to those of skill in the art without departing from the scope and spirit of this invention, as defined in the appended claims.

What is claimed is:

1. An installation for taking photographs or sequences of photographs, comprising:

acquisition means for receiving analog signals from an optical image of a subject of which it is desired to take a photograph or a sequence of photographs, said subject being positioned within the installation and in view of said acquisition means and wherein said acquisition means defines an acquisition axis and includes two cameras whose fields of acquisition are, respectively, vertical and horizontal, the optical axis of one of said two cameras being coincident with said acquisition axis by means of a second half-silvered mirror positioned along the bisector of the real optical axes of said two cameras so that the acquisition of images is effected equally by either or both of said cameras as a function of the type of photograph desired;

memory means for storing the optical information received by said acquisition means;

a first screen, connected to said acquisition means, for allowing simultaneous viewing by the subject of the image received by said acquisition means;

photographing means for taking the desired photograph or the sequence of photographs;

a first half-silvered mirror, mounted on the optical axis of said acquisition means and being directed along a bisector of the angle defined by the optical axes of said acquisition means and said first screen respectively, so as to generate a virtual image of said first screen on the optical axis of said acquisition means;

a central processing unit, connected to said acquisition means and photographing means, being fitted with a digitization card intended to digitize the analog signals received by said acquisition means, the digital signals thereby obtained being capable of undergoing processing by said central processing unit to be conveyed to said first screen so as to allow simultaneous viewing by the subject of the image or of the images received by said acquisition means and, optionally, capable of further processing by said central processing unit upon command of the subject; and an interaction element, interposed between said central processing unit and the subject, capable of being actuated by the subject while positioned within the installation and viewing the image on said first screen, to freeze the image reproduced on said first screen at the instant of the image's actuation in said memory means and capable of inducing the image's production on a medium by said photographing means upon further actuation by the subject.

2. The installation as claimed in claim 1 wherein said first half-silvered mirror is positioned at 45° in relation to the optical axes of said acquisition means and said first screen.

3. The installation as claimed in claim 1 wherein said acquisition means includes a video camera.

4. The installation as claimed in claim 1 wherein said acquisition means includes a photographic camera including a charge-transfer member.

5. The installation as claimed in claim 1 wherein said acquisition means includes a color scanner capable of collecting and analyzing analog signals produced by a given image, text, or photograph and further capable of converting the collected analog signals into digital signals for further processing.

6. The installation as claimed in claim 1 wherein said acquisition means includes a video tape recorder and a video screen, the recorder capable of receiving a video cassette to produce its images on said video screen and allowing freeze-frame selection of the view or views desired to be photographed by said photographing means.

7. The installation as claimed in claim 1 wherein said acquisition means includes an electronic component capable of reading an image previously recorded in digital form on a removable medium.

8. The installation as claimed in claim 1 wherein the analog signals received by said acquisition means and digitized by said central processing unit are further processed by the unit to place the image received by said acquisition means onto a background, behind a foreground, or through a transparent surface previously selected by the subject, said background and foreground information being stored in the form of digital signals in said memory means, and the digital signal thus obtained after processing also being stored in said memory means while being shown in real time on said first screen.

9. The installation as claimed in claim 8, wherein said central processing unit further includes external data acquisition means for receiving data in radio form through a link with a switched telephone network.

10. The installation as claimed in claim 1 wherein said photographing means includes a color printer using thermal sublimation that is connected to said central processing unit to receive therefrom the digital signals corresponding to the image selected by the subject.

11. The installation as claimed in claim 10 wherein said color printer comprises:

a printing head;

a first automatic loader for thermal films, the first loader being capable of replacing an exhausted cassette of thermal film by a cassette of new thermal film at said printing head;

a second automatic loader for said medium, the second loader being capable of replacing an exhausted cassette of said medium by a full cassette thereof.

12. The installation as claimed in claim 1 wherein said photographing means includes a self-contained integrated unit for printing photographs, comprising:

means for storing, unwinding and exposing a reversible photosensitive paper intended to be exposed to light signals;

a digital processing unit, connected to said central processing unit, capable of subjecting signals from said central processing unit to video reversal processing to form a negative image;

a second screen being connected to said central processing unit, said second screen intended to form the image to be taken in negative;

at least one lens placed on the optical axis of said second screen to project the image of said second screen onto a zone of exposure of said photosensitive paper;

a chemical processing unit having a plurality of juxtaposed baths and an automatic element for transferring the exposed paper through the plurality of chemical baths; and means for drying the desired photograph obtained after printing.

13. The installation as claimed in claim 12 wherein said second screen is a color screen, on the optical axis of which color filters are interposed in the vicinity of said at least one lens so that a color image may be reconstructed on the photosensitive paper.

14. The installation as claimed in claim 12 wherein said means for storing, unwinding, and exposing the reversible photosensitive paper comprises:

a first and second cassette, each for containing a roll of the paper in strip form, and each having an exit slot;

a set of drive/press rollers associated with each cassette being positioned proximate to the exit slot thereof so that the leading end of each of the rolls may be prewound onto its corresponding set of drive/press rollers;

an unwinding element for directing each strip of paper into the self-contained printing unit; and a detecting element for identifying the presence of the trailing end of the paper roll contained in said first cassette as the end exits therefrom, and for causing the rewinding of the first paper roll back inside said first cassette by actuation of the corresponding set of drive/ press rollers while also causing the prewinding of the paper roll contained in said second cassette onto said unwinding element by actuation of the set of drive/ press rollers corresponding to said second cassette.

15. The installation as claimed in claim 3 wherein the sequence of photographs is a film recorded on a first video cassette provided in a video tape recorder, the recorded film thus produced being taken directly from the images received by said video camera and processed by said central processing unit and from audio signals picked up by a microphone provided in the installation.

16. The installation as claimed in claim 15 wherein the film produced by said video camera is mixed at said central processing unit with an animated backdrop stored on a floppy disk, the information thus stored being transferred to said central processing unit for mixing.

17. The installation as claimed in claim 8, wherein said central processing unit further includes external data acquisition means for receiving data in radio form through a link with a digital network using integration of services by modulator and demodulator.

18. The installation as claimed in claim 8, wherein said central processing unit further includes external data acquisition means for receiving data in radio form by direct introduction using a reader for magnetic media including floppy disks.

19. The installation as claimed in claim 12 wherein said second screen is a black and white screen, on the optical axis of which color filters are interposed in the vicinity of said at least one lens so that a color image may be reconstructed on the photosensitive paper.

20. The installation as claimed in claim 15 wherein the film produced by said video camera is mixed at said central processing unit with an animated backdrop stored on a video disk, the information thus stored being transferred to said central processing unit for mixing.

21. The installation as claimed in claim 15 wherein the film produced by said video camera is mixed at said central processing unit with an animated backdrop stored on a second video cassette, the information thus stored being transferred to said central processing unit for mixing.

22. An installation for taking photographs or sequences of photographs, comprising:

acquisition means for receiving analog signals from an optical image of a subject of which it is desired to take a photograph or a sequence of photographs;

memory means for storing the optical information received by said acquisition means;

a first screen, connected to said acquisition means, for allowing simultaneous viewing by the subject of the image received by said acquisition means;

photographing means for taking the desired photograph or the sequence of photographs;

a first half-silvered mirror, mounted on the optical axis of said acquisition means and being directed along a bisector of the angle defined by the optical axes of said acquisition means and said first screen respectively, so as to generate a virtual image of said first screen on the optical axis of said acquisition means;

a central processing unit, connected to said acquisition means and photographing means, being fitted with a digitization card intended to digitize the analog signals received by said acquisition means, the digital signals thereby obtained being capable of undergoing processing by said central processing unit to be conveyed to said first screen so as to allow simultaneous viewing by the subject of the image or of the images received by said acquisition means and, optionally, capable of further processing by said central processing unit upon command of the subject; and an interaction element, interposed between said central processing unit and the subject, capable of being actuated by the subject to freeze the image reproduced on said first screen at the instant of the image's actuation in said memory means and capable of inducing the image's production on a printing medium by said photographing means upon further actuation by the subject, wherein said acquisition means defines an acquisition axis and includes two cameras whose fields of acquisition are, respectively, vertical and horizontal, the optical axis of one of said two cameras being coincident with said acquisition axis, and the optical axis of the other camera being virtually coincident with said acquisition axis by means of a second half-silvered mirror positioned along the bisector of the real optical axes of said two cameras so that the acquisition of images is effected equally by either or both of said cameras as a function of the type of photograph desired.

* * * * *